April 12, 1966          F. W. W. MORLEY          3,245,734
SUPPORTING BEARINGS ON SHAFTS
Filed Oct. 25, 1963
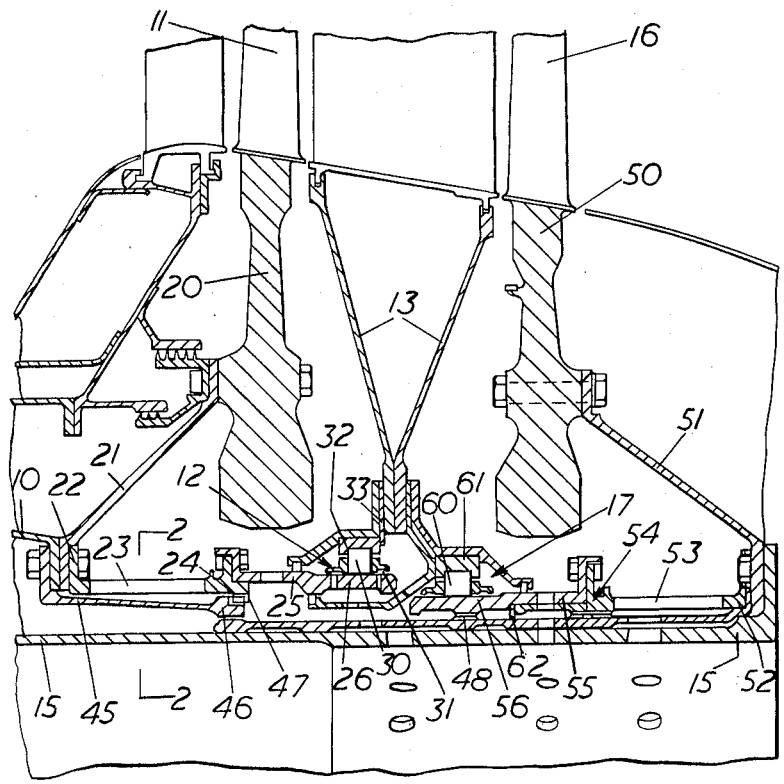
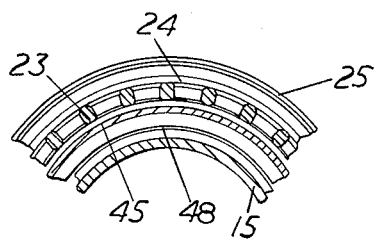
Inventor
Frederick William Walton Morley
By
Cushman, Darby + Cushman
Attorneys

United States Patent Office 3,245,734
Patented Apr. 12, 1966

3,245,734
SUPPORTING BEARINGS ON SHAFTS
Frederick William Walton Morley, Derby, England, assignor to Rolls-Royce Limited, Derby, England, a company of Great Britain
Filed Oct. 25, 1963, Ser. No. 318,913
Claims priority, application Great Britain, Nov. 12, 1962, 42,723/62
9 Claims. (Cl. 308—184)

The invention concerns bearings.

According to the present invention there is provided a bearing at least one portion of which is resiliently connected to a rotatable shaft by a plurality of angularly spaced apart, axially extending resilient bars.

Preferably, the bearing comprises rolling elements each of which is in rolling contact with inner and outer races, one of said races being resiliently connected to the said shaft by said bars.

The term "rolling elements" is to be understood to include roller bearings, needle bearings, ball bearings and the like.

The bearing need not include rolling elements, and thus could be a plain bearing which is lubricated by oil or air.

In a preferred embodiment of the present invention, there is provided means for limiting radial movement of the said one race.

Preferably, there is also provided means for preventing excessive torque loads on said bars. Thus said means may comprise a frusto-conical sleeve disposed between said one race and said shaft and adapted to be drivingly connected between said one race and said shaft when the torque load between them is excessive.

Preferably the opposite ends of said sleeve are respectively connected to said shaft and disposed between angularly spaced apart teeth fixed to said one race.

The term "excessive torque loads" is to be understood to means load in excess of the torque loads experienced during normal operation.

Preferably, the said one race is the outer race of the bearing.

The invention also provides a gas turbine engine having shafting on which is mounted a compressor and a turbine of the engine, said shafting being journalled within a bearing as set forth above.

The invention is illustrated, merely by way of example, in the accompanying drawings, in which:

FIGURE 1 is a part sectional elevation of a part of a gas turbine jet propulsion engine provided with two bearings according to the present invention, and FIGURE 2 is a sectional elevation of part of the engine of FIGURE 1 taken on the line 2—2 of that figure.

In the drawings is shown part of a gas turbine jet propulsion engine comprising a hollow shaft 10 to which is attached, by means of a frusto-conical member 21, a high pressure turbine disc 20 carrying a set of turbine blades 11. The hollow shaft 10 also carries a high pressure compressor (not shown). The hollow shaft 10 is journalled within a bearing 12 which is supported by fixed structure 13.

Concentrically mounted within the hollow shaft 10 is a hollow shaft 15 on which is mounted, by means of a frusto-conical member 51 a low pressure turbine disc 50 carrying a set of turbine blades 16. The shaft 15 also carries a low pressure compressor (not shown). The hollow shaft 15 is journalled within a bearing 17 supported by the fixed structure 13.

Bolted to the hollow shaft 10 is a ring 22 integral with which are the ends of a series of axially extending angularly spaced apart resilient bars 23. The ends of the resilient bars 23 remote from the ring 22 are integral with a ring 24. The ring 24 is bolted to an annular support 25, one part of which constitutes an inner race 26 of the bearing 12.

The bearing 12 also comprises rollers 30, which are disposed within a cage 31, and an outer race 32. The outer race 32 is welded to an inner end 33 of the fixed structure 13.

Also attached to the hollow shaft 10 is a frusto-conical sleeve 45. The end of the sleeve 45 remote from the hollow shaft 10 has an enlarged portion 46 formed with a series of angularly spaced apart teeth intercalated with teeth 47 provided on the ring 24.

The teeth on enlarged portion 46 are radially spaced from the ring 24 by a small annular gap. The enlarged portion 46 is also radially spaced by a small annular gap from a sleeve 48, fixed to the hollow shaft 15.

It will be appreciated that if, because of static or dynamic unbalance, the hollow shaft 10 is subjected to orbiting loads, the resultant vibrations will not be transmitted to the fixed structure 13 through the bearing 12 since the vibrations will be isolated in the resilient connection provided by the resilient bars 23. By this means, high fatigue loading of the outer race 32 and the fixed structure 13 is prevented.

Also, it will be appreciated that, with the resilient connection between the hollow shaft 10 and the bearing 12, vibrations of the hollow shaft 10 do not reach the static outer race 32 of the bearing 12, and thus this bearing is not subjected to the additional loads which would be caused by movement of the outer race 32. Also, all lubricating and servicing devices for the bearing 12 may be quite standard, and need not be modified to allow for vibration of the outer race.

The enlarged portion 46, disposed between the sleeve 48 and the ring 24 limits resilient radial movement of the ring 24 and hence of the annular support 25 and inner race 26. Since radial movement of the ring 24 is not excessive, the danger of the bars 23 breaking in the event of severe unbalance of the hollow shaft 10 is reduced.

If the bearing 12 should become tight or partially rigid, an excessive torque, or overload torque, would be set up across the bars 23. Since these bars need to be relatively slender and resilient, they cannot be constructed to withstand high torques, and are made to withstand normal running torque only. However, should excessive torque loads arise, the "drive" between the hollow shaft 10 and bearing inner race 26 is taken through the frusto-conical sleeve 45, the teeth on enlarged portion 46 engaging the teeth 47 and forming a "dog clutch" drive. Thus the excessive torque load is taken by the frusto-conical sleeve 45 and not by the resilient bars 23.

The hollow shaft 15, supporting the low pressure turbine blades 16, is supported by the bearing 17 in a manner substantially identical to that just described with reference to the hollow shaft 10 and the bearing 12. For this reason the manner in which the hollow shaft 15 is supported will not be described in great detail.

Attached to the hollow shaft 15 is a ring 52 integral with which are the ends of a series of axially extending, angularly spaced apart resilient bars 53. The ends of the resilient bars 53 remote from ring 52 are integral with a ring 54 which is in turn attached to a support 55. A portion of the support 55 constitutes an inner race 56 of the bearing 17. The bearing 17 also comprises rollers 60 and an outer race 61 which is rigidly attached to the fixed structure 13.

The inner race 56 of the bearing 17 is radially spaced from the sleeve 48 by a small gap only, and therefore radial displacements of the inner race 56 will be restricted by the inner race 56 contacting the sleeve 48.

To prevent the resilient bars 53 experiencing excessive torque loads, excessive torque loads are transmitted from the hollow shaft 15 to the inner race 56, through interengaging teeth 62 provided on the sleeve 48 and on the inner race 56.

Thus, whilst retaining a relatively simple supporting structure for the bearing 17, the present invention provides a device whereby out-of-balance or orbiting loads are accommodated and high fatigue loadings are not experienced by the supporting structure.

I claim:

1. In a gas turbine engine, a rotatable shaft, a bearing supporting said shaft and comprising inner and outer races and rolling elements in rolling contact with said races, a plurality of angularly spaced apart, axially extending resilient bars resiliently connecting one of said races to said shaft, and a sleeve disposed between said one race and said shaft, the sleeve being drivingly connected between said one race and said shaft when the torque load between them is excessive.

2. In a gas turbine engine, a rotatable shaft, a bearing supporting said shaft and comprising inner and outer races and rolling elements in rolling contact with said races, a plurality of angularly spaced apart, axially extending resilient bars resiliently connecting one of said races to said shaft, a plurality of angularly spaced apart teeth fixed to said one race, and a sleeve, one end of which is connected to said shaft and the other end of which is disposed between said teeth, the sleeve being drivingly connected between the said one race and said shaft when the torque load between them is excessive.

3. The combination claimed in claim 2 wherein said axially extending resilient bars resiliently connect the inner race of said bearing to said shaft, means being provided for limiting radial movement of said inner race.

4. In a gas turbine engine, a rotatable shaft, a bearing supporting said shaft and comprising inner and outer races and rolling elements in rolling contact with said races, a plurality of angularly spaced apart, axially extending resilient bars symmetrical in cross section and resiliently connecting one of said races to said shaft, and a sleeve disposed between said one race and said shaft, the sleeve being drivingly connected between said one race and said shaft when the torque load between them is excessive.

5. In a gas turbine engine, a rotatable shaft, a bearing supporting said shaft and comprising inner and outer races and rolling elements in rolling contact with said races, a plurality of angularly spaced apart, axially extending resilient bars symmetrical in cross section and resiliently connecting one of said races to said shaft, a plurality of angularly spaced apart teeth fixed to said race, and a sleeve, one end of which is connected to said shaft and the other end of which is disposed between said teeth, the sleeve being drivingly connected between the said one race and said shaft when the torque load between them is excessive.

6. In a gas turbine engine having a rotatable shaft and fixed structure, the improvement in means for rotatably supporting the shaft from the fixed structure comprising: a bearing having inner and outer races with rolling elements in contact therewith; resilient means drivingly connecting one of said races to said shaft at normal running torque between the one race and the shaft while the other of said races is fixedly connected to the fixed structure, said means including a first ring member operatively connected to said shaft, a second ring member operatively connected to said one race and a plurality of angularly spaced apart resilient bars extending between and supported at their ends by said rings; and means for drivingly connecting said shaft to said one race when there is excessive torque load between the same, said last mentioned means including angularly spaced apart teeth operatively fixed to the said one race, a substantially rigid sleeve member operatively connected to said shaft, said sleeve member having angularly spaced apart teeth thereon intercalated with the teeth operatively fixed to the one race.

7. The gas turbine engine as claimed in claim 6 in which said sleeve member operatively connected to the shaft extends axially away from the same, and in which said resilient bars are coaxial of said sleeve member.

8. The gas turbine engine as claimed in claim 6 in which said sleeve member operatively connected to said shaft surrounds the end portion of said shaft and in which said resilient bars are coaxial of said sleeve member.

9. The gas turbine engine as claimed in claim 6 in which the teeth on said sleeve member and the teeth operatively fixed to said one race and intercalated with each other have respective roots and tips radially spaced from each other whereby there is limited radial movement of said one race.

References Cited by the Examiner

UNITED STATES PATENTS

| 2,158,847 | 5/1939 | Baumann | 64—15 |
| 2,732,695 | 1/1956 | Davis | 230—116 |
| 3,046,759 | 7/1962 | Deford et al. | 64—11 |

FOREIGN PATENTS

| 29,441 | 9/1910 | Sweden. |

DAVID J. WILLIAMOWSKY, *Primary Examiner.*

FRANK SUSKO, *Assistant Examiner.*